United States Patent Office.

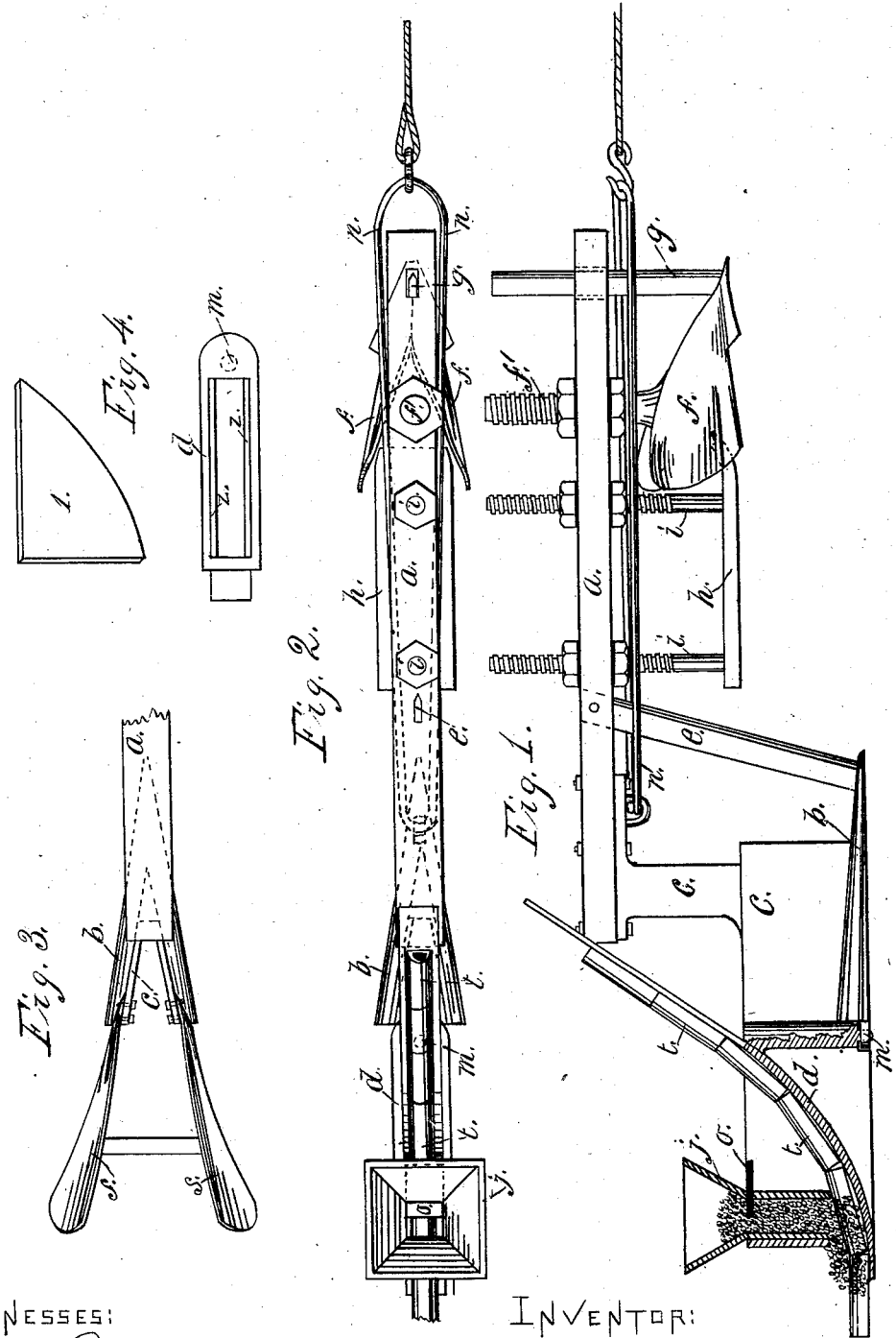

WILLIAM T. WASSON, OF THORNTOWN, INDIANA, ASSIGNOR OF ONE-HALF TO JAMES A. BALL, OF SAME PLACE.

DITCHING-MACHINE.

SPECIFICATION forming part of Letters Patent No. 259,248, dated June 6, 1882.

Application filed October 31, 1881. (No model.)

*To all whom it may concern:*

Be it known that I, WILLIAM T. WASSON, of Thorntown, in the county of Boone and State of Indiana, have invented a new and useful Improvement in Ditching-Machines, of which the following is a specification, having reference to the accompanying drawings.

My invention relates to that class of ditching-machines used for making tile-drains, and has for its object the more perfect grading of the bottom of the ditch on which the tiles are to lie, the more convenient construction and manner of attaching the tile-chute to the mole-plow, and the covering of the tiles, as they are laid, with a layer of gravel, and the formation of an open or covered ditch, as may be desired, all as hereinafter described.

The accompanying drawings illustrate my invention.

Figure 1 is a side elevation, a portion of the tile-chute and the gravel-chute being shown in section. Fig. 2 is a plan. Fig. 3 is a partial plan, showing the detachable mold-board connected to the mole for making an open ditch, the tile-chute being removed. Fig. 4 is a plan of the tile-chute, showing the removable liners *z z* for changing the interior width of the chute to suit different-sized tiles. Similar removable liners are made of different thicknesses, and their lower edges fit nicely the inclined bottom of the chute. 1, Fig. 4, is a perspective view of one of said liners.

The same letters indicate the same parts in all views.

*a* is a beam, to which is rigidly secured the mole-plow *b*, which is of the usual form, except that the lower portion of the standard *c* is in the form of a long wedge, so made for the purpose of opening a passage in the earth for the tile-chute *d* by compressing the earth to each side. A straight colter, *e*, is attached to the forward end of the plow and the beam, as shown.

*f* is a double plow, having mold-boards on each side alike, and having a colter, *g*, attached to its point and passing upward through a mortise in the beam. The plow *f* is connected with the beam by a heavy standard, *f'*, on which a screw is formed. Said screw passes through nuts, one on each side of the beam above and below, for the purpose of adjusting the depth to which the plow is to cut. The bottom of the plow is designed to be, in practice, even with or below the top of the inclosed portions of the tile-chute.

*h* is a gage connected to the beam by the standards *i i*, which are also threaded and adjustable vertically by means of nuts, as shown. The lower portion of the tile-chute is inclosed, as shown, the tiles passing out through an opening in the lower rear corner. It has been found desirable to place a layer of gravel of a few inches in thickness immediately above the tiles, and to do this it has heretofore been necessary to make an open ditch, to be afterward filled. For the purpose of thus placing the gravel without the necessity of making an open ditch, I have provided the hopper and chute *j*, which is removably secured in the rear end of the tile-chute, as shown, and into which the gravel is thrown, and passes out with and above the tiles to be immediately covered by the earth closing behind the machine. The tile-chute *d*, instead of being rigidly connected to the plow, as heretofore, has its forward end rounded and connected to the plow by a pivot-joint, *m*, placed at the bottom of the plow and tile-chute. The pin in said joint works loosely in the opposite part, so that when the forward end of the plow is depressed in first entering the earth it does not raise the rear end of the tile-chute, and in turning a curve in the ditch the tile-chute is not cramped.

The draft-rods *n* are connected to the beam at a point just in front of the mole-standard. By making the draft from this point instead of the forward end of the beam the grading-plow is relieved from undue downward draft, and the gage *h* is easily raised or lowered.

The operation of my machine is as follows: A capstan or winding-engine being placed at a suitable distance from the point of beginning the ditch—say one hundred feet, or thereabout—and the desired inclination of the drain for that distance having been determined, the capstan being located at the upper or shallower part and the machine at the other or deepest end, the capstan or engine is connected to the draft-rods *n* by a rope or chain and the machine drawn forward. When the forward end is depressed the pivot-joint connecting the tile-chute and mole-plow, being placed at the bottom and loosely fitting, allows it to yield vertically, and thus avoids the tipping up of the rear end of the tile-chute, that would occur if the tile-chute were rigidly connected, or if the pivot-joint were at the top instead of the bottom of the chute. The mole having entered to the required depth for the bottom of the drain, a spirit-level is now applied to the beam, and the grading-plow and gage so adjusted as to raise the forward end of the beam, so that its upper surface is at the same pitch or inclination as is desired for the bottom of the drain. Tiles $t$ are now placed in the tile-chute end to end, the lower one just emerging from the rear end of the bottom of the inclosed portion of the chute, and the hopper and gravel-chute $j$ is filled with gravel. As the machine is drawn forward the grading-plow $f$ cuts through and throws to each side all minor inequalities of the surface, and forms a smooth even surface on which the gage $h$ rests, thus guiding the mole in an even true path and giving the bottom of the drain a straight surface at the desired inclination. The tiles pass out of the chute into the opening made by the mole-plow, the gravel passing out in a layer above them, the thickness of said layer being governed by the sliding valve $o$ in the throat of the gravel-chute, and the earth which has been pressed to each side by the wedge-shaped standard of the mole closing over the tile and gravel immediately in the rear of the tile-chute. When an open ditch is required I detach the tile-chute and secure to the rear of the wedge-shaped standard of the mole-plow, by suitable bolts through the sides thereof, a detachable double mold-board, $s\ s$, Fig. 3. The mole then answers the purpose of a point to the double plow thus formed, and the earth is lifted and thrown to each side the whole depth of the ditch.

Having thus described my machine, I claim as my invention—

1. A secondary chute or gravel-box, $j$, combined with the tile-chute of a tile-laying ditching-machine, substantially in the manner and for the purpose set forth.

2. The combination, with the mole-plow $b\ c$, of the leveling-plow $f$, the tile-chute $d$, gravel-chute $j$, and beam $a$, substantially as shown and described.

In testimony whereof I have hereunto signed my name.

WILLIAM T. WASSON.

Witnesses:
JAMES A. BALL,
CHARLES H. SNYDER.